No. 760,909. PATENTED MAY 24, 1904.
B. McADAMS.
SELF FEEDER FOR CORN SHREDDING MACHINES.
APPLICATION FILED DEC. 14, 1903.
NO MODEL. 3 SHEETS—SHEET 1.
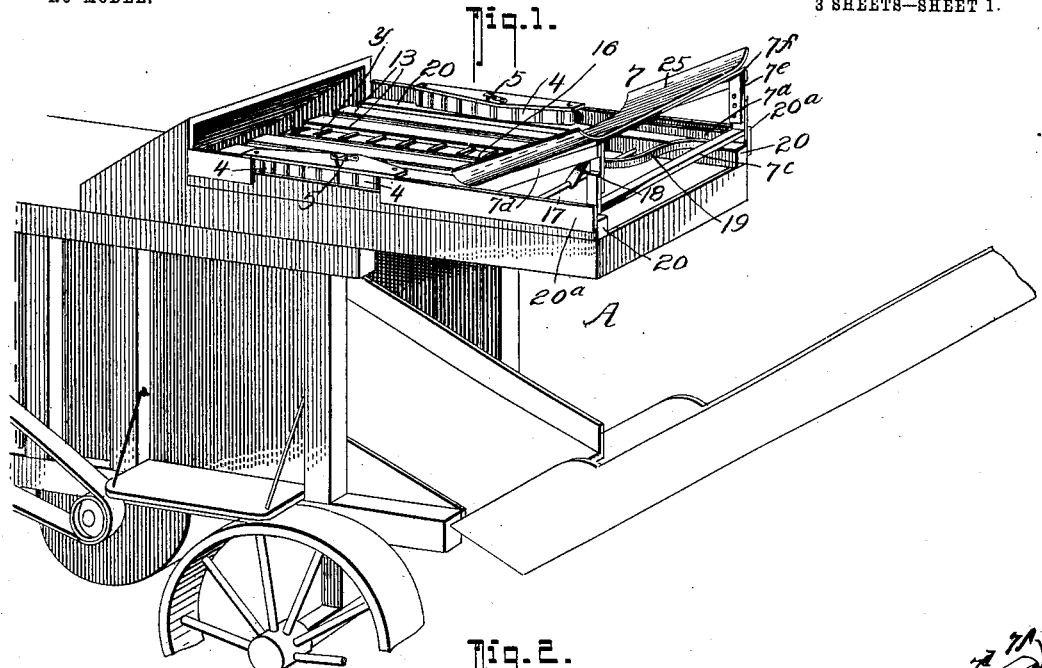
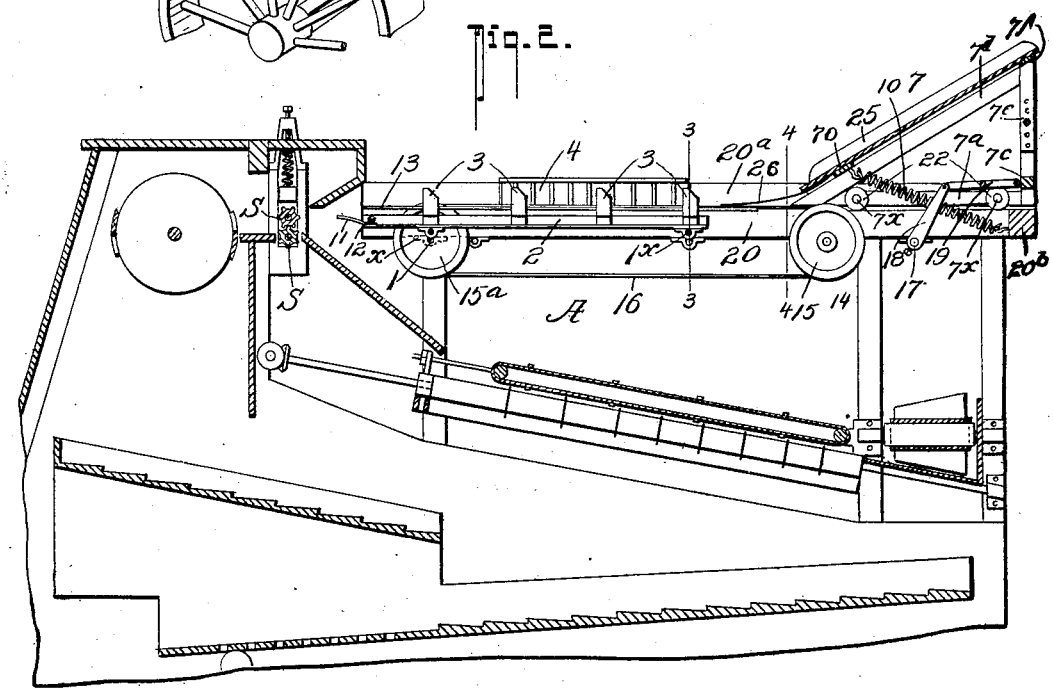
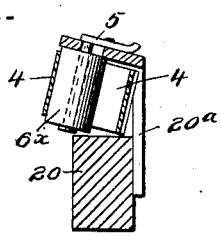
WITNESSES:
F. C. Gibson.
Louis Dieterich
INVENTOR
Bela Mc Adams.
BY
Fred G. Dieterich
ATTORNEYS

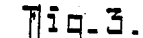
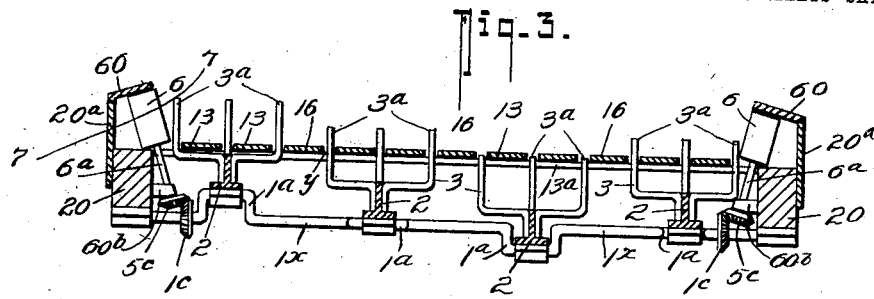
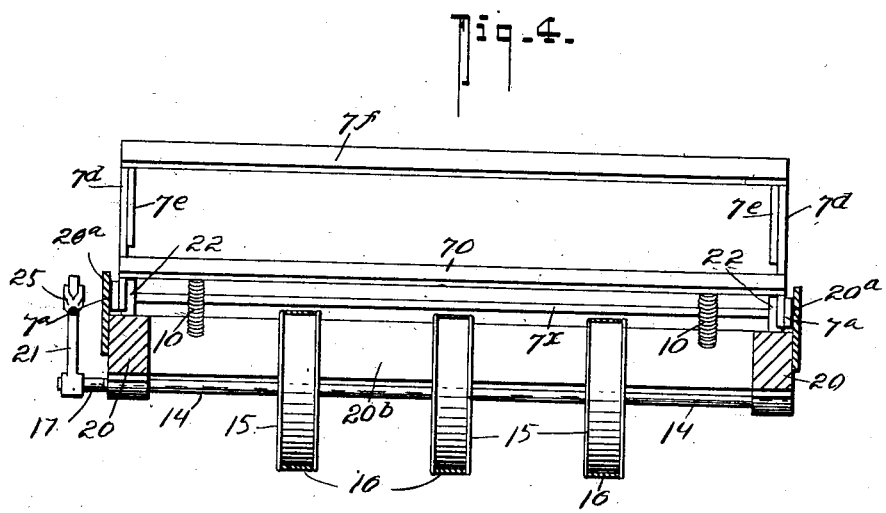
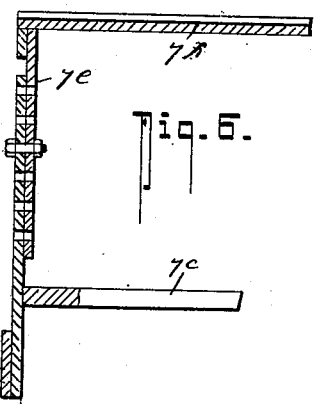

No. 760,909. PATENTED MAY 24, 1904.
B. McADAMS.
SELF FEEDER FOR CORN SHREDDING MACHINES.
APPLICATION FILED DEC. 14, 1903.
NO MODEL. 3 SHEETS—SHEET 3.
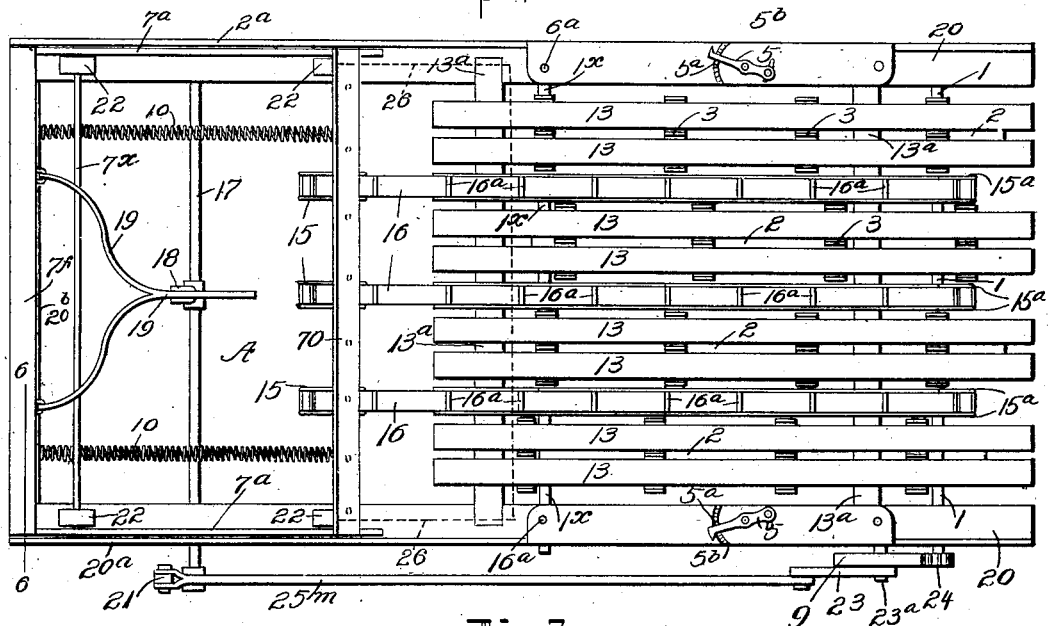
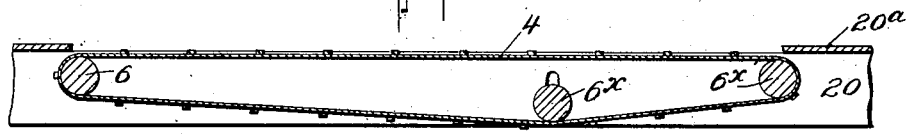
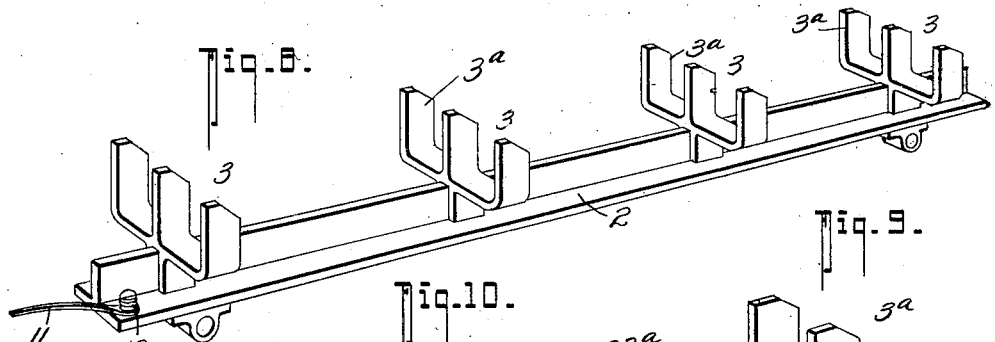
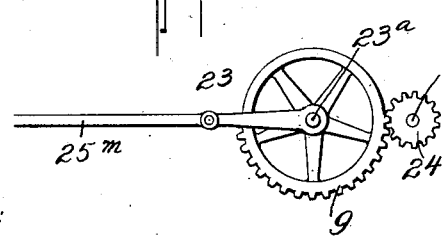
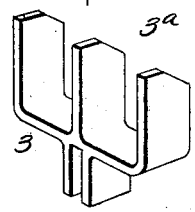
WITNESSES:
F. C. Gibson.
Louis Dieterich
INVENTOR
Bela McAdams.
BY
Fred G. Dieterich
ATTORNEYS No. 760,909. Patented May 24, 1904.

UNITED STATES PATENT OFFICE.

BELA McADAMS, OF HEPBURN, OHIO.

SELF-FEEDER FOR CORN-SHREDDING MACHINES.

SPECIFICATION forming part of Letters Patent No. 760,909, dated May 24, 1904.

Application filed December 14, 1903. Serial No. 185,174. (No model.)

*To all whom it may concern:*

Be it known that I, BELA McADAMS, residing at Hepburn, in the county of Hardin and State of Ohio, have invented a new and Improved Self-Feeder for Corn-Shredding Machines, of which the following is a specification.

My invention seeks to provide a simple and economically-constructed automatically-actuating feeder mechanism for corn shredding and husking machines which will serve as a convenient means for feeding the corn to the snapping-rolls of a shredding-machine in a manner to insure uniformity of action in a speedy and effective manner.

With other objects in view my invention in its generic nature comprehends a special construction of slatted platform adapted to be mounted upon the receiving end of a shredding-machine of the ordinary type arranged to convey the corn to the snapping-rolls of said machine and including intermittently-actuating pusher or agitator members and endless conveyer-belts that coöperate with the agitator for packing the corn toward the discharge end of the feeder to enter between the snapping-rolls.

My invention also includes a peculiar and novel arrangement of cart or receiving-trough, which is reciprocally mounted to convey the corn lengthwise over and upon the endless conveyers in such manner that the pusher or packer finger will effectively engage with said corn and pack it forward toward the snapping or pinching rolls.

In its more subordinate features my invention consists in sundry details of construction and novel combination of parts, all of which will be hereinafter described, specifically pointed out in the appended claims, and illustrated in the accompanying drawings, in which—

Figure 1 is a perspective view of my improved self-feeding mechanism. Fig. 2 is a longitudinal section thereof, together with so much of the corn-shredding mechanism as is necessary to illustrate the practical application of my invention. Fig. 3 is a tranverse section of the same on the line 3 3 of Fig. 2. Fig. 4 is a similar view on the line 4 4 of Fig. 2. Fig. 5 is a plan view of a portion of the platform and its coöperating parts, the hopper being removed. Fig. 6 is a transverse section of the same on the line 6 6 of Fig. 5. Fig. 7 is a horizontal section taken on the line 7 7 of Fig. 3. Fig. 8 is a detail perspective view of a portion of the longitudinally-disposed angle-bars that connect with the crank-axles. Fig. 9 is a similar view of a cluster of packer or agitator members. Fig. 10 is a detail side elevation of the mutilated gear and the pinion on the crank-shaft that actuates it. Fig. 11 is a detail cross-section showing the roller $6^x$ and its coöperating tightener devices.

In the drawings, A designates so much of the ordinary type of corn-shredder as is necessary to properly show the application of my improvement, and 20 20 denote a pair of parallel-disposed side bars that sustain my improved self-feeding mechanism, and to the said bars 20 are secured vertical guard-plates $20^a$, that form side guides for the reciprocally-mounted cart or stock-receiver, presently again referred to, and S S designate the usual snapping or pinching rolls.

Near the inner or delivery end of the feeder is mounted a transversely-disposed crank-shaft 1, journaled at the ends in bearings $x$ upon the under side of the bars 20 and at the point about midway the feeder, and parallel with the said shaft 1 is mounted a second crank-shaft $1^x$, and the two shafts 1 and $1^x$ are formed with a member or cranks $1^a$, disposed relatively in the same longitudinal plane.

The crank portions of the shafts 1 and $1^x$ are connected by longitudinally-disposed bars 2 2, composed of angle-steel having an inverted-T shape in cross-section, and upon each of the said bars is mounted a number of packer or agitator members 3, mounted in clusters, and which are in the nature of vertical fingers or extensions, the upper ends $3^a$ of which are adapted to project above the slatted platform for a purpose to be more fully explained.

The slatted platform or bottom of the feeder upon which the corn is delivered from the wagon consists of a series of flat steel bars 13, secured near the ends to the transversely-disposed supporting steel bars 13$^a$, the ends of which are mounted upon and secured to the side beams 20 of the frame. As will be clearly understood from Fig. 1 the slatted bottom or platform is located at the delivery end of the feeder and extends down sufficiently to project slightly beyond the crank-shaft 1$^x$, whereby to allow for placing the cart or stock-receiver 7 on the entrant end of the feeder to move substantially in the horizontal plane of the slatted platform, as will presently be more fully explained.

14 designates a transverse shaft which is disposed in front of the entrant end of the slatted platform and upon which are mounted to rotate therewith a number of flanged pulleys 15 15. These pulleys 15 are located in the longitudinal alinement with a like number of flanged pulleys 15$^a$, mounted upon the shaft 1 to rotate therewith, and the said pulleys 15 15$^a$ carry endless belts 16 16, which are provided with cross ribs or slats 16$^a$ 16$^a$. Each slatted belt 16 is located in a wide space between the adjacent sides of the platform-bars 13 and to travel between the outer fingers or members 3$^a$ of the feeder of adjacent packers or agitators, as shown.

4 4 designate supplemental slatted belts, one at each side of the machine, and the said belts are disposed in the vertical plane, but are preferably slightly inclined, as best shown in Figs. 3 and 7.

Each belt 4 takes around a pulley 6, mounted on a shaft 6$^a$, and the shafts 6$^a$ are journaled at the upper ends in bracket members 60, that project inwardly and at right angles from the bars 20 and are secured to the side guides 20$^a$, and at the lower ends the said shafts are journaled in brackets 60$^b$, that project inwardly from the said bars 20, as shown in Figs. 3 and 4. The belts 4 also engage with loosely-journaled rollers 6$^x$ 6$^x$, and the several rollers 6$^x$ 6$^x$ and the belts 4 are so disposed relatively to the side guides 20$^a$ and the adjacent platform members 3 whereby they will materially assist in properly feeding the stock forward toward the discharge end of the machine and prevent the same clogging at the sides of the feeder-frame.

Motion may be imparted to the belt 4 from the shaft 1$^x$, which in practice is driven by the drive-shaft, one of which connects the said shaft 1$^x$ directly with one of the drive-shafts of the shredding-machine, and the said shaft 1$^x$ has bevel-pinions 1$^c$, that engage the bevel-pinions 6$^c$ on the lower end of the shafts 6$^a$, that carry the pulley 6.

The cart or stock-receiver 7, before referred to, comprises a carriage formed of horizontal side bars 7$^a$, a pair of cross rods or axles 7$^x$ 7$^x$, mounted in the side bars 7$^a$ and upon which are mounted rollers 22, that engage and ride upon the side beams 20, as shown, and the carriage or cart 7 also includes end portions formed of inclined bars 7$^d$, vertical bars 7$^e$, and the cross-bar 7$^f$, that connects with the upper ends of the vertical bars 7$^e$.

25 designates a hopper or table formed of sheet metal bent to a proper shape which is fastened to the inclined bars 7$^d$ and to a cross-bar 70, and at the discharge end the said table has a flexible strip 26, which aids in clearing the adjacent parts of the loose stock and also protects the said parts and closes the space between the belts 4 and the entrant end of the platform when the cart is at its innermost position.

17 designates a shaft parallel with the shafts 1 and 1$^x$, journaled on the under side of the beams 20 at a point in advance of the shaft 14. Upon the shaft 17 is mounted for lateral adjustment thereon a crank 18, with which adjustably connects a yoke member 19, the diverging arms of which are hinged to the rear cross-bar 7$^c$ of the carriage or cart 7, and 10 designates retractile springs connected at one end to the permanent cross-beam 20$^b$ of the main frame and at the other end to the front cross-bar 70 of the cart 7.

The shaft 17 projects at one end beyond the beam 20, and upon the said projected end is mounted a crank-arm 21, which connects, through the medium of the extensible pitman-rod 25$^m$, with the crank-arm 23, mounted upon the end of the stub-shaft 23$^a$ adjacent the shaft 1. Upon the shaft 23$^a$ is mounted a mutilated gear 9, which meshes with the cog-pinion 24 upon the end of the shaft 1, as clearly shown in the drawings.

Upon the front end of each longitudinally-movable bar 2 is mounted a scratcher 11, which is in the nature of a spring-finger, that projects longitudinally forward from the discharge end of the feeder and which has a lateral spring movement by reason of their inner ends terminating in spring-coils 12 and mounting the said coil ends upon the members 2, as shown.

5 designates tighteners, one of which is mounted upon each of the bracket-plates 60, that extend over the vertically-disposed belts 4, and the said tighteners consist of arms pivotally mounted to swing in the horizontal plane and having a handle or detent member 5$^a$, adapted to engage with the ratchet 5$^b$ for holding the said member 5 to its adjusted position. The arm 5 has a pin projecting through a slot in the bracket-plate, which carries a roller 6$^x$, that engages with the belt 4 to loosen or tighten the said belt.

From the foregoing, taken in connection with the accompanying drawings, it is believed the complete operation and construction, as also the advantages of my invention, will be readily understood by those skilled in the art to which it appertains.

The corn in practice is thrown from the wagon onto the cart 7 and the platform of the carriage in the manner clearly understood from Fig. 1 of the drawings. The reciprocal motion imparted to the cart 7 in the usual direction causes the corn to be so engaged by the several sets of packer-fingers and conveyers that the same is separated and conveyed lengthwise in a uniform, regular, and expeditious manner to the snapping or pinching rolls, the said movement of the cart being effected by the mutilated gear, the adjustable pitman 25, and the shaft 17, that connects with the yoke 19, it being understood the upward or reverse movement of the cart or carriage 7 is effected in a quick and abrupt manner by the retractile springs 10 10 when the smooth portion of the mutilated gear opposes the drive-pinion 24. The movement of the carriage conveys the stock over the slatted platform in a position to be properly engaged by the conveyer-belts 16 and the packer and agitator fingers 3, which cause the stock to feed in the proper direction toward the shredding mechanism.

By reason of the improved construction, the arrangement of parts as shown and described, and the manner of operation of my machine clogging of the corn is prevented and a regular and uniform movement of the stalks lengthwise in the direction of and into the snapping-rolls is effected. By reason of the action of my feeder the stalks can be the more uniformly conveyed to the snapping or pinching rolls and under a greater capacity than can be effected in the usual manner by hand.

Slight changes in the details of construction and modification thereof may be made without departing from my invention or the scope of the appended claims.

Having thus described my invention, what I claim, and desire to secure by Letters Patent, is—

1. A feeder mechanism for corn-shredding machines, comprising a feeder or conveyer composed of endless belts having transverse slats, a carriage which receives the stock to be shredded, reciprocally movable over and adapted to discharge the stock onto the conveyer, a means for imparting longitudinal motion to the conveyer and for reciprocally moving the carriage over the conveyer, said means including a belt-and-gear connection between the carriage and the main drive mechanism of the machine, for the purposes described.

2. As an improvement in feeders of the character described, a slatted platform, a supporting-frame therefor including vertical side guides, horizontally-disposed endless slatted conveyers which operate in the longitudinal plane of the slatted platform between the opposite edges thereof, and endless vertically-disposed slatted belts operating between the opposite edges of the platform and the vertical side guides of the frame, means for imparting motion to the said belts, and a separate means for feeding the stock onto the slatted platform and the horizontal and vertical belts, as set forth.

3. The combination with the frame-timbers 20, the slatted platform-bars mounted thereon, the crank-shafts 1 and $1^x$, the longitudinally-disposed bars 2 connecting the cranks of the said shafts 1 and $1^x$, a series of packer-fingers projected up from the said bars 2 between the slatted platform-bars, endless slatted belts operable longitudinally between each set of packer-fingers and the slatted bars, and means for discharging the stock onto the slatted platform and for imparting motion to the crank-shafts the bars 2 and the several belts, as set forth.

4. In a feeding mechanism as described, the combination with a supporting-frame including the bars 20 and the vertical side guides $20^a$, and the slatted platform supported by the bars 20, of the shafts 1 and $1^x$, the longitudinally-disposed bars 2 connected with the cranks of the shafts 1 and $1^x$, and a series of packer-fingers mounted on the said bars 2 and projected up through the slatted platform, a series of endless slatted belts operating in the longitudinal plane of the slatted platform, a stock-receiver reciprocally movable on the frame-timbers 20 and adapted to move over the slatted platform, said carriage being automatically returnable rearwardly, and an intermittently-operating gear mechanism actuated by one of the crank-shafts for intermittently moving the said carriage forward, as set forth.

5. A feeder mechanism for corn-shredding machines, comprising a slatted platform, endless conveyers movable in the longitudinal plane thereof and having an undulating motion with respect to the platform, a stock-receiver reciprocally movable over and adapted to discharge the stock onto the conveyer and the platform, as set forth.

6. In a feeding mechanism as described, the combination with a supporting-frame, a slatted platform and an undulatory movable conveyer operating in the slatted platform, of a stock-receiving cart mounted on the frame and movable over the slatted platform and adapted to discharge the stock onto the said platform, and means for positively moving the cart in its forward direction and simultaneously actuating the conveyers, the said cart being automatically movable in its rearward direction, as set forth.

7. In a feeding mechanism as described, in combination with the shredding means and with conveyer devices for conveying the stock forward to the shredding means; of a stock-carrier reciprocally movable over the said conveyer devices, springs for pulling said carrier back, and a means for intermittently moving said carrier forward and against the tension of the said springs, as set forth.

8. In a feeder of the character described, the combination with the conveyer devices which include longitudinal reciprocable bars carrying packer members; of scratcher-fingers mounted on the end of said bars projected in the longitudinal plane thereof, said fingers each consisting of a spring-wire member having a coil and secured to the aforesaid bars, as set forth.

BELA McADAMS.

Witnesses:
  JACOB LOUBIS,
  WILLIAM T. ELSASSER.